US009793678B2

(12) United States Patent
Gylys et al.

(10) Patent No.: US 9,793,678 B2
(45) Date of Patent: Oct. 17, 2017

(54) ENERGY RATIO SENSOR FOR LASER RESONATOR SYSTEM

(71) Applicant: The Boeing Company, Chicago, IL (US)

(72) Inventors: Vytas T. Gylys, Bell Canyon, CA (US); Andrea Koumvakalis, Thousand Oaks, CA (US); Gregory A. Needham, Simi Valley, CA (US); Dale A. Holmes, Pahrump, NV (US)

(73) Assignee: The Boeing Company, Chicago, IL (US)

( * ) Notice: Subject to any disclaimer, the term of this patent is extended or adjusted under 35 U.S.C. 154(b) by 819 days.

(21) Appl. No.: 14/453,318

(22) Filed: Aug. 6, 2014

(65) Prior Publication Data

US 2017/0117682 A1 Apr. 27, 2017

(51) Int. Cl.
*H01S 3/13* (2006.01)
*H01S 3/08* (2006.01)
*H01S 3/081* (2006.01)
*H01S 3/06* (2006.01)
(Continued)

(52) U.S. Cl.
CPC .......... *H01S 3/1305* (2013.01); *H01S 3/0604* (2013.01); *H01S 3/0606* (2013.01); *H01S 3/0813* (2013.01); *H01S 3/08059* (2013.01); *H01S 3/08095* (2013.01); *H01S 3/0941* (2013.01); *H01S 3/1618* (2013.01); *H01S 3/1643* (2013.01)

(58) Field of Classification Search
CPC .... H01S 3/1305; H01S 3/0604; H01S 3/0606; H01S 3/08059; H01S 3/08095; H01S 3/0813
See application file for complete search history.

(56) References Cited

U.S. PATENT DOCUMENTS

| 7,978,746 B2 | 7/2011 | Holmes |
| 8,035,892 B2 | 10/2011 | Curtin et al. |
| 2002/0075911 A1 | 6/2002 | Cham et al. |

(Continued)

FOREIGN PATENT DOCUMENTS

| CN | 204517132 U | 7/2015 |
| GB | 2227878 A * | 8/1990 |

(Continued)

OTHER PUBLICATIONS

Combined Search and Examination Report under Sections 17 and 18(3), UK Intellectual Property Office, Application No. GB1617036.7 (Client Ref. No. P63169GB1) dated Nov. 15, 2016, 5 pages.

(Continued)

Primary Examiner — Armando Rodriguez
(74) Attorney, Agent, or Firm — Toler Law Group, PC (57) ABSTRACT

A device includes a first sensor configured to generate a first output signal corresponding to an energy of a portion of a forward beam transmitted by a mirror of a laser resonator system. The device further includes a second sensor configured to generate a second output signal corresponding to an energy of a portion of a return beam transmitted by the mirror. A ratio of the energy of the portion of the forward beam and the energy of the portion of the return beam corresponds to a measurement of a feedback ratio of the laser resonator system.

19 Claims, 5 Drawing Sheets

(51) Int. Cl.
*H01S 3/16* (2006.01)
*H01S 3/0941* (2006.01)

(56) References Cited

U.S. PATENT DOCUMENTS

2010/0027572 A1 2/2010 Widen et al.
2013/0322471 A1 12/2013 Rossbach

FOREIGN PATENT DOCUMENTS

| | | |
|---|---|---|
| GB | 2227878 A | 8/1990 |
| JP | H077202 A | 1/1995 |
| WO | 2013184261 A2 | 12/2013 |
| ZA | 201106107 R | 8/2011 |

OTHER PUBLICATIONS

Combined Search and Examination Report under Sections 17 and 18(3), UK Intellectual Property Office, Application No. GB1617040.9 (Client Ref. No. P63169GB2), dated Feb. 27, 2017.

\* cited by examiner

FIG. 5

ENERGY RATIO SENSOR FOR LASER RESONATOR SYSTEM

FIELD OF THE DISCLOSURE

The present disclosure relates to an energy ratio sensor for use in laser resonator systems.

BACKGROUND

Certain types of laser systems, such as unstable laser resonators, can be useful to generate high power laser output but can be difficult to control and monitor. For example, in a laser resonator system, light beams are reflected along optical paths at the same time that the light beams are amplified (e.g., energy of the light beams is increased). A portion of the light beams may be output from the laser resonator system, while another portion of the light beams is reflected back into the laser resonator system. Output power of the laser resonator system may not provide an accurate estimate of power of light beams reflected within the laser resonator system. Although components of the laser resonator system may be designed to reflect or transmit high power light beams, the components are not perfectly reflective or transmissive. Absorbing only a portion of the high power light beams may cause heating of components of the laser resonator system. Heating of the components may cause changes to components, which can lead to instability or even damage to the laser resonator system.

SUMMARY

Fold mirrors of a laser resonator system may be designed to transmit (e.g., leak) a portion of beams reflected within the laser resonator system. By monitoring transmitted (e.g., leaked) energy of a forward beam and transmitted (e.g., leaked) energy of a return beam at a particular fold mirror, an estimate of an energy ratio for the laser resonator system can be determined. The energy ratio may indicate operational characteristics of the laser resonator system and may provide information about stability and control of the laser resonator system. Additionally, information based on forward beam transmission and return beam transmission, such as the energy ratio, can be used to control components of the laser resonator system to provide a more stable and efficient output of the laser resonator system. For example, one or more components along optical paths within the laser resonator system may be adjusted responsive to the energy ratio to increase the efficiency of the laser resonator system. Additionally, the energy ratio may be compared to expected values based on design parameters of the laser resonator system to control the laser resonator system to reduce a possibility of or to prevent damage to the laser resonator system.

In a particular embodiment, a device includes a first sensor configured to generate a first output signal corresponding to an energy of a portion of a forward beam transmitted by a mirror of a laser resonator system. The device further includes a second sensor configured to generate a second output signal corresponding to an energy of a portion of a return beam transmitted by the mirror. A ratio of the energy of the portion of the forward beam and the energy of the portion of the return beam may be indicative of operational characteristics of the laser resonator system.

In another particular embodiment, a laser resonator system includes at least one gain medium device including a gain medium. The gain medium may be configured to output a light beam by stimulated emission responsive to pump light. The laser resonator system includes a plurality of mirrors including a primary mirror, a secondary mirror, and at least one fold mirror. The primary mirror, the secondary mirror, and the at least one fold mirror may form a forward optical path from the primary mirror to the secondary mirror and form a return optical path from the secondary mirror to the primary mirror. The forward optical path and the return optical path may include the at least one gain medium device. The laser resonator system may further include a sensor system coupled to a particular fold mirror of the at least one fold mirror. The sensor system may be configured to generate output based on an energy of forward light of the forward optical path that is transmitted by the particular fold mirror and based on an energy of return light of the return optical path that is transmitted by the particular fold mirror.

In another particular embodiment, a method includes receiving, from a sensor of a laser resonator system, at least one output signal. The at least one output signal may be based on an energy of a portion of a forward beam that is transmitted by a mirror of the laser resonator system and based on an energy of a portion of a return beam transmitted by the mirror. The method may further include controlling a component of the laser resonator system based on the at least one output signal.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

Figure 1:
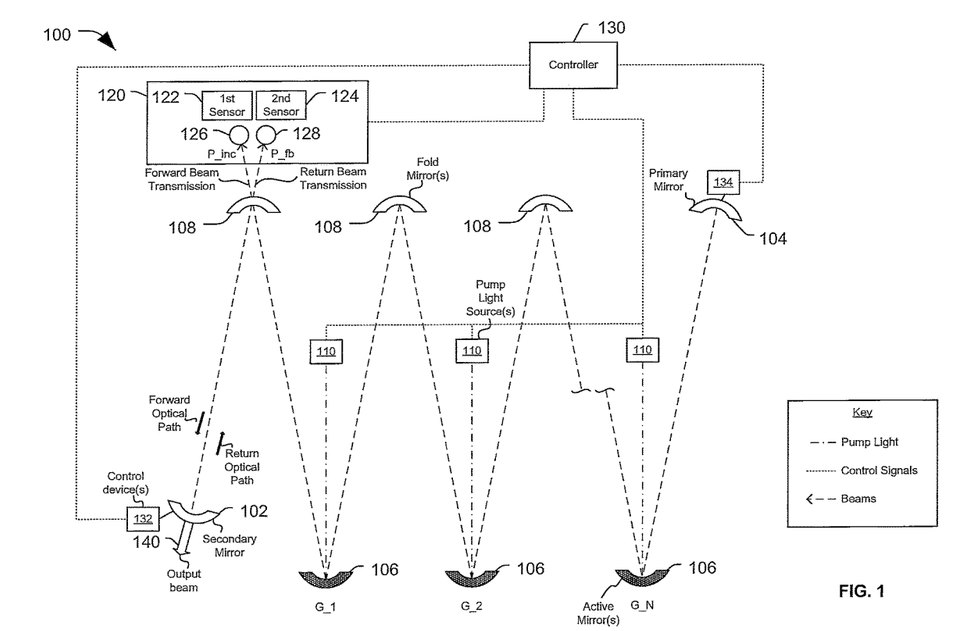
FIG. 1 is a diagram that illustrates a first particular embodiment of a laser resonator system.
Figure 3:
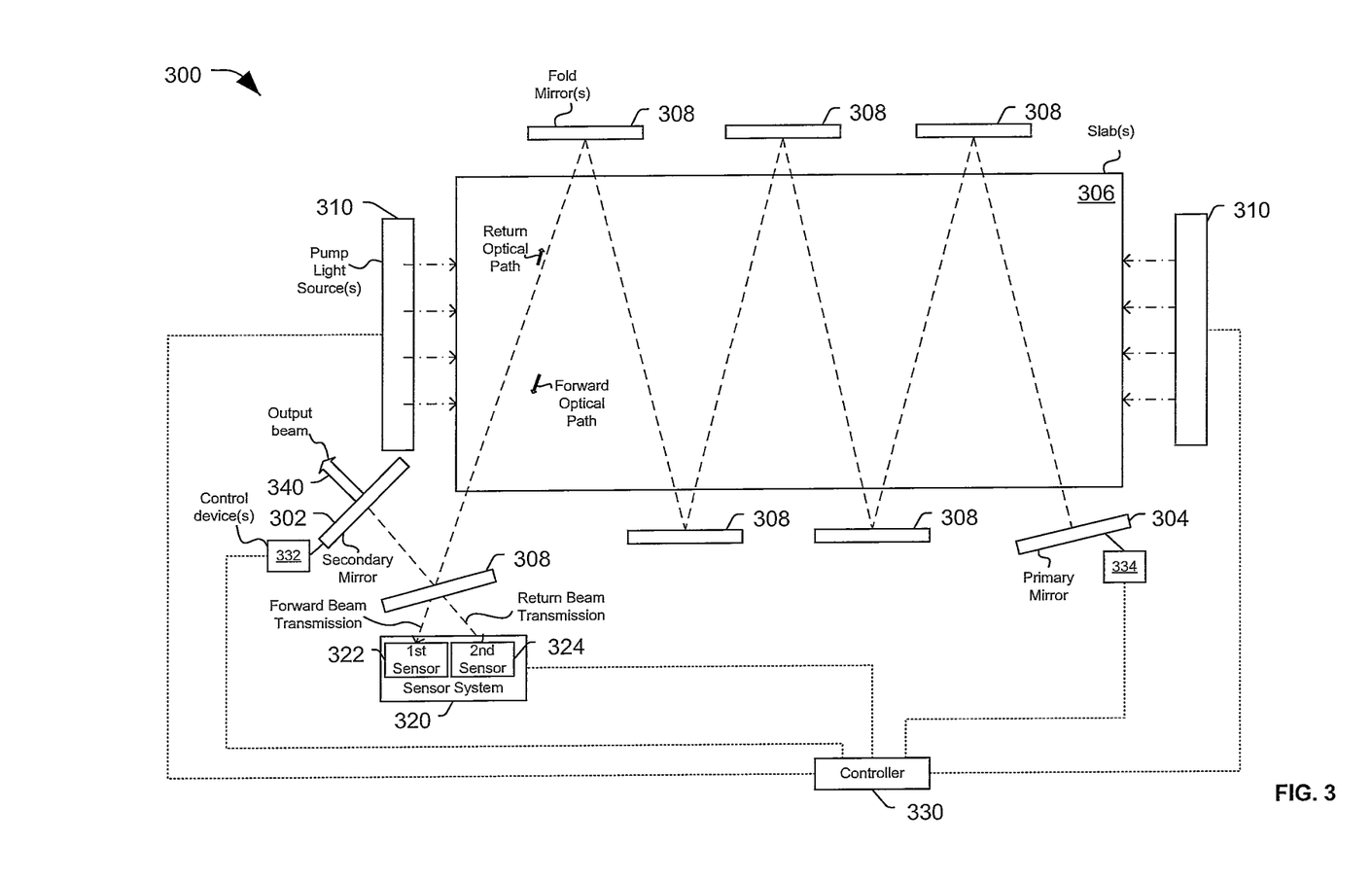
FIG. 3 is a diagram that illustrates a second particular embodiment of a laser resonator system.

FIG. 1 illustrates a particular embodiment of a laser resonator system 100. The laser resonator system 100 illustrated in FIG. 1 is shown as an unstable thin disk laser resonator system. However, in other embodiments, other laser resonator systems may be used, such as a slab resonator system as illustrated in FIG. 3. In FIG. 1, the laser resonator system 100 includes a secondary mirror 102 (also known as an output coupler). The secondary mirror 102 is configured to reflect a first portion of light (e.g., a beam) received at the secondary mirror 102 along a return optical path toward a primary mirror 104 of the laser resonator system 100. The secondary mirror 102 is also configured to allow a second portion of the light received at the secondary mirror 102 to pass through as an output beam 140.

The laser resonator system 100 also includes the primary mirror 104. The primary mirror 104 is configured to reflect a beam along a forward optical path toward the secondary mirror 102. For example, the primary mirror 104 may receive the beam projected along the return optical path and may reflect the beam along the forward optical path. Thus, the primary mirror 104 and secondary mirror 102 form two optical paths: the forward optical path in a forward direction toward the secondary mirror 102 and the return optical path in a return direction toward the primary mirror 104.

Along the two optical paths are one or more fold mirrors, such as fold mirrors 108. The fold mirrors 108 are configured to direct (e.g., reflect) light beams along the two optical paths in the appropriate directions. For example, a particular fold mirror of the fold mirrors 108 may receive a first beam along the return optical path from the secondary mirror 102 and may direct the first beam along the return optical path toward the primary mirror 104. Additionally or alternatively, the particular fold mirror may receive a second beam along the forward optical path from the primary mirror 104 and may direct the second beam along the forward optical path toward the secondary mirror 102. In the particular embodiment illustrated in FIG. 1, the laser resonator system 100 includes three fold mirrors 108. In other embodiments, the laser resonating system 100 may include more than three fold mirrors 108 or fewer than three fold mirrors 108.

The laser resonator system 100 also includes a gain medium. In a thin disk laser resonator system, such as the laser resonator system 100, the gain medium may be a portion of one or more active mirrors 106. Although three active mirrors 106 are illustrated in FIG. 1, the laser resonator system 100 may include more than three active mirrors 106 or fewer than three active mirrors 106. In this example, the gain medium may be mounted (e.g., coupled) to a back surface of each of the active mirrors 106 (e.g., thin disks). In a particular embodiment, the gain medium may be ytterbium-doped yttrium aluminum garnet (Yb:YAG). The back surface of the active mirrors 106 may be a highly reflective surface such that light received along either of the two optical paths may be reflected in a direction along the respective optical path.

In order to initiate and control projection of beams along the optical paths, the active mirrors 106 may be provided with pump light from one or more pump light sources 110. The pump light sources 110 may include laser diodes configured to provide pump light to the active mirrors 106 to excite the gain medium of the active mirrors 106. When the excitation of the gain medium exceeds a lasing threshold, the active mirrors 106 "lase" (e.g., emit light amplified stimulated emission), thereby projecting light (e.g., beams). Thus, when pump light is provided from the pump light sources 110 to the active mirrors 106, the active mirrors 106 may begin to project light along the forward optical path, along the return optical path, or both.

Each beam travels along the optical paths of the laser resonator system 100 by being reflected by at least one of the fold mirrors 108, the active mirrors 106, the secondary mirror 102, and the primary mirror 104. Travelling along the optical paths causes the beam to resonate and to gain energy. For example, as a particular beam travels through each gain medium on the active mirrors 106, the energy of the beam increases (e.g., additional photons are emitted by the gain medium). Accordingly, as more active mirrors 106 are added to the laser resonator system 100, power generated by the laser resonator system 100 (e.g., power of the output beam 140) may increase. Thus, thin disk laser resonators provide a convenient mechanism for generating a high power (e.g., high energy) laser output.

In a particular embodiment, each of the fold mirrors 108 is designed to transmit a very small portion of light through the fold mirror. For example, despite having a highly reflective coating, each of the fold mirrors 108 may transmit (e.g., leak) a portion of a forward beam and a portion of a return beam. In this example, the forward beam refers to light projected along the forward optical path (e.g., light which is generally directed from the primary mirror 104 toward the secondary mirror 102) and the return beam refers to light travelling along the return optical path (e.g., light which is generally directed from the secondary mirror 102 toward the primary mirror 104). As illustrated in FIG. 1, a particular fold mirror 108 may transmit a portion of the forward beam as forward beam transmission (e.g., leakage) and may transmit (e.g., pass through the particular fold mirror 108 rather than reflect) a portion of the return beam as return transmission (e.g., leakage). Power of the forward beam transmission and the return beam transmission may be based on a transmission characteristic T of the particular fold mirror 108. In a particular embodiment, the transmission characteristic T may be selected during a design process to minimally effect power of the forward beam and the return beam while providing sufficient power of the forward beam transmission and the return beam transmissions. Although the forward beam transmission and the return beam transmission are illustrated in FIG. 1 as being sampled at the particular fold mirror 108 that is closest to the secondary mirror 102, the forward beam transmission and the return beam transmission may be sampled at any one or more of the fold mirrors 108 of the laser resonator system 100 in other embodiments. For example, the forward beam transmission and the return beam transmission may be sampled at a second fold mirror when a gain (G) of each active mirror 106 (e.g., each individual disk) is substantially similar, as further described with reference to FIG. 2.

Because the beams are directional, the beam transmissions continue along their respective directions of travel when the beams strike approximately the same point on the particular fold mirror 108. Thus, by placing a first sensor (e.g., a first power sensor) along a direction of travel of the forward beam transmission and placing a second sensor (e.g., a second power sensor) along a direction of travel of the return beam transmission, relative power of the forward beam transmission and relative power of the return beam transmission may be sampled.

The forward beam and the return beam may have different energy levels at any point in the laser resonator system 100. For example, at the particular fold mirror 108 closest to the secondary mirror 102, the forward beam may have more energy than the return beam because only a portion of the forward beam is reflected by the secondary mirror 102 as the return beam. By using the same fold mirror (e.g., the particular fold mirror 108) to sample the relative power (or energy) of each beam transmission, variations among fold mirrors do not influence the relative power of the sampled beam transmissions. Similarly, since the beams strike the particular fold mirror 108 at approximately the same point, variations within the particular fold mirror 108 are minimized or negated.

In order to sample the beam transmissions, the laser resonator system 100 includes a first sensor 122 configured to generate a first output signal corresponding to the energy of the forward beam transmission P1 (e.g., a portion of the forward beam transmitted by the particular fold mirror 108).

The laser resonator system 100 also includes a second sensor 124 configured to generate a second output signal corresponding to the energy of the return beam transmission P2 (e.g., a portion of the return beam transmitted by the particular fold mirror 108). In the particular embodiment illustrated in FIG. 1, the sensors 122 and 124 are coupled to receive the beam transmissions via integrating spheres. For example, the first sensor 122 may be optically coupled to a first integrating sphere 126 that receives the forward beam transmission and provides the forward beam transmission to the first sensor 122. The second sensor 124 may be optically coupled to a second integrating sphere 128 that receives the return beam transmission and provides the return beam transmission to the second sensor 124. In other embodiments, the sensors 122 and 124 may detect the energy of the beam transmissions (e.g., P1 and P2) without using the integrating spheres 126 and 128.

The sensors 122 and 124 may form a sensor system 120. A magnification (M) of the laser resonator system 100 (e.g., an unstable resonator) may be determined based on mirror radii of curvature (ROC) and/or based on mirror separation associated with the mirrors of the laser resonator system 100. A feedback ratio (FBR) may be determined based on a ratio of the energy of the return beam transmission to the energy of the forward beam transmission (e.g., P2/P1). The P2/P1 ratio may be generated based on measurements from the sensors 122 and 124. In some embodiments, the P2/P1 ratio may correspond to the feedback ratio (e.g., P2/P1=FBR).

The sensor system 120 may provide an output to a controller 130. The controller 130 may be configured to generate control signals based on the P2/P1 ratio. The controller 130 may be configured to receive information such as data or a signal indicating the energy of the forward beam transmission (e.g., P1) sampled by the first sensor 122, data or a signal indicating the energy of the return beam transmission (e.g., P2) sampled by the second sensor 124, data or a signal indicating a ratio of the energy of the forward beam transmission to the energy of the return beam transmission (e.g., P2/P1), or a combination thereof. The energy ratio may be indicative of operational characteristics of the laser resonator system 100. For example, the energy ratio may be related to the feedback ratio FBR. The feedback ratio FBR is a ratio of the energy of a return beam reflected by the secondary mirror 102 (P_fb) to the energy of a forward beam provided to the secondary mirror 102 (P_inc). When the sensor system 120 is positioned behind the first fold mirror of the laser resonator system 100, the FBR may be determined based on Equation 1:

$$FBR = P\_fb/P\_inc = P2/P1 \quad \text{(Eq. 1)}$$

Based on the values of P1 and P2 from the sensors 122, 124, the controller 130 may control (e.g., adjust) the magnification (M) of the laser resonator system 100 by adjusting the ROC or the axial position of one or more mirrors of the laser resonator system 100, such as the primary mirror 104. Adjusting the ROC or the axial position of the one or more mirrors may compensate for changes to the laser resonator system 100 during power up. For example, when the laser resonator system 100 powers up, one or more of the mirrors (e.g., mirrors 102, 104, 106, and 108) may dynamically change ROCs, which, may change the magnification M the feedback ratio FBR. The changes to the magnification M and the feedback ratio FBR may cause changes in properties of the output beam 140, which may damage the laser resonator system 100. Based on the P2/P1 ratio, the controller 130 may adjust the FBR to reduce or prevent the changes in the properties of the output beam 140. For example, the controller 130 may modify one or more ROCs or one or more axial positions of one or more of the mirrors 102, 104, 106, and 108. When the sensor system 120 is located behind the first fold mirror, the P2/P1 ratio may correspond to a measurement of the feedback ratio FBR, which may be used by the controller 130 to generate control signals, such as control signals to change one or more ROCs or axial positions of one or more of the mirrors 102, 104, 106, and 108.

A single sensor system 120 is illustrated in FIG. 1 for convenience. In another embodiment, each of the fold mirrors 108 may have a respective first sensor 122 and a respective second sensor 124, and energy ratios for each of the fold mirrors 108 may be determined. The energy ratios associated with each of the fold mirrors 108 may be used to estimate the feedback ratio. The energy ratios and the feedback ratio may be used to stabilize operation of the laser resonator system 100. To illustrate, one or more components of the laser resonator system 100 may be adjusted, as further described herein.

As another example, the energy ratio may indicate an efficiency of the laser resonating system 100. In this example, the energy ratio may be calculated in real-time based on the outputs of the sensors 122 and 124 and may be compared to an expected energy ratio associated with the laser resonator system 100. The expected energy ratio may be based on one or more design parameters of the laser resonator system 100, such as reflectivity (e.g., a reflective profile magnification) of the mirrors (e.g., active mirrors 106, fold mirrors 108, or both), a number of mirrors (e.g., active mirrors 106, fold mirrors 108, or both) in the laser resonator system 100, characteristics of the secondary mirror 102 (e.g., the output coupler), a power of the pump light output by the pump light sources 110, other appropriate parameters, or a combination thereof. If the calculated energy ratio deviates from the expected energy ratio, the laser resonator system 100 may not be operating efficiently (e.g., within a target operating range). For example, one or more components may be degraded or damaged, thereby causing the calculated energy ratio to deviate from the expected energy ratio and reducing the efficiency of the laser resonator system 100. Damage may be caused to one or more components, such as the active mirrors 106, the fold mirrors 108, the primary mirror 104, and the secondary mirror 102 from, for example, overheating due to the high power of the beams travelling in the laser resonator system 100.

In order to maintain efficient operation of the laser resonator system 100 and to prevent damage of optical components of the laser resonator system 100, the controller 130 may be coupled to one or more control components to control operation of the laser resonator system 100 responsive to the information received from the sensor system 120. In a particular embodiment, the controller 130 may change a focus associated with forward light (e.g., a focal characteristic of the forward beam), a focus associated with return light (e.g., a focal characteristic of the return beam), or both, in order to improve or to maintain operation of the laser resonator system 100. To illustrate, the controller 130 may control a control device 134 (e.g., a control component) that is configured to change optical properties associated with the primary mirror 104. For example, the primary mirror 104 may be a deformable mirror, and the control device 134 may be configured to adjust an amplitude associated with a shape of the primary mirror 104. As another example, the control device 134 may be configured to change a pointing direction of the primary mirror 104, to change a focal point of the primary mirror 104, to move the primary mirror 104 (e.g., in a direction along the return optical path or the forward optical path), or a combination thereof. By changing the above-described optical properties of the primary mirror 104, beams travelling along the return optical path or the forward optical path may be adjusted to change operation of the laser resonator system 100.

In addition or in the alternative, the controller 130 may be coupled to a control device 132 that is coupled to the secondary mirror 102. The control device 132 may be configured to change optical properties associated with the secondary mirror 102. For example, the control device 132 may be configured to change a pointing direction of the secondary mirror 102, to change a focal point of the secondary mirror 102, to move the secondary mirror 102 (e.g., in a direction along the forward optical path or the return optical path), or a combination thereof. Similar control devices may be coupled to any one or more of the fold mirrors 108 or the active mirrors 106. Thus, each of the reflective components (e.g., the mirrors 102, 104, 106, and 108) of the laser resonator system 100 may be adjustable by the controller 130 based on the energy ratio of the forward beam transmission and the return beam transmission in order to improve or maintain operation of the laser resonator system 100.

In addition to adjusting the reflective components, or in the alternative, one or more of the pump light sources 110 may be controlled by the controller 130 responsive to the energy ratio. As explained above, the beams reflected within the laser resonator system 100 may reach high power levels. Thermal energy absorbed by the active mirrors 106 from the forward beam, the return beam, and the pump light may increase the temperature of the active mirrors 106. The increase in temperature may cause changes in optical properties of the active mirrors 106. For example, expansion due to heating may change the shape of one or more of the active mirrors 106. By adjusting the pump light output from the pump light sources 110, the change in temperature may be reduced or compensated for. For example, by reducing output power provided by the pump light sources 110, the temperature change may be reduced and the optical properties (e.g., the shape) of the active mirrors 106 may be maintained such that the efficiency of the laser resonator system 100 is not reduced and the components are not damaged by overheating.

Additionally or alternatively, the controller 130 may be configured to shut down (e.g., turn off) the laser resonator system 100 to prevent damage. For example, the controller 130 may be configured to compare a measured energy ratio determined based on the output of the sensor system 120 to a particular expected energy ratio to identify a deviation between the measured energy ratio and the expected energy ratio. If the deviation exceeds a threshold value (e.g., an energy ratio safety margin), the controller 130 may shut down the laser resonator system 100 to prevent damage to one or more components. If the deviation does not exceed the threshold value, operation of the laser resonator system 100 may continue. Alternatively, rather than shutting down the laser resonator system 100 if the deviation exceeds the threshold value, the controller 130 may be configured to adjust optical properties of one or more components of the laser resonator system 100 (e.g., the mirrors 102, 104, 106, and 108 and the pump light sources 110, as described above) to reduce the deviation and thereby increase the efficiency of the laser resonator system 100. In another particular embodiment, the sensor system 120 may implement a first threshold and a second threshold. When a deviation (between the measured energy ratio and the expected energy ratio) exceeds the first threshold the controller 130 may adjust at least one operating parameter of the laser resonator system 100 and when the deviation exceeds the second threshold the controller 130 may shut down the laser resonator system 100.

During operation, the controller 130 causes the pump light sources 110 to provide pump light to the active mirrors 106 to cause the laser resonator system 100 to generate the output beam 140. The controller 130 may receive at least one control signal from the sensor system 120 based on beam transmissions at the particular fold mirror 108. Based on the at least one output signal, the controller 130 controls one or more components (e.g., elements) of the laser resonator system 100 to increase efficiency of the laser resonator system or to reduce a possibility of damage to components of the laser resonator system 100. For example, the controller adjusts optical properties of one or more of the mirrors 102, 104, 106, and 108 based on the energy ratio received from, or generated based on, the at least one output signal.

By controlling the laser resonator system 100 (e.g., via the controller 130), based on the energy of the forward beam transmission, the energy of the return beam transmission, or the energy ratio (e.g., the ratio of the energy of the forward beam transmission and the energy of the return beam transmission), operation (e.g., the efficiency) of the laser resonator system 100 may be maintained or improved. Additionally, controlling the laser resonator system 100 based on the energy ratio may decrease the risk of damage to components of the laser resonator system 100, such as overheating of the active mirrors 106 or the fold mirrors 108.

Figure 2:
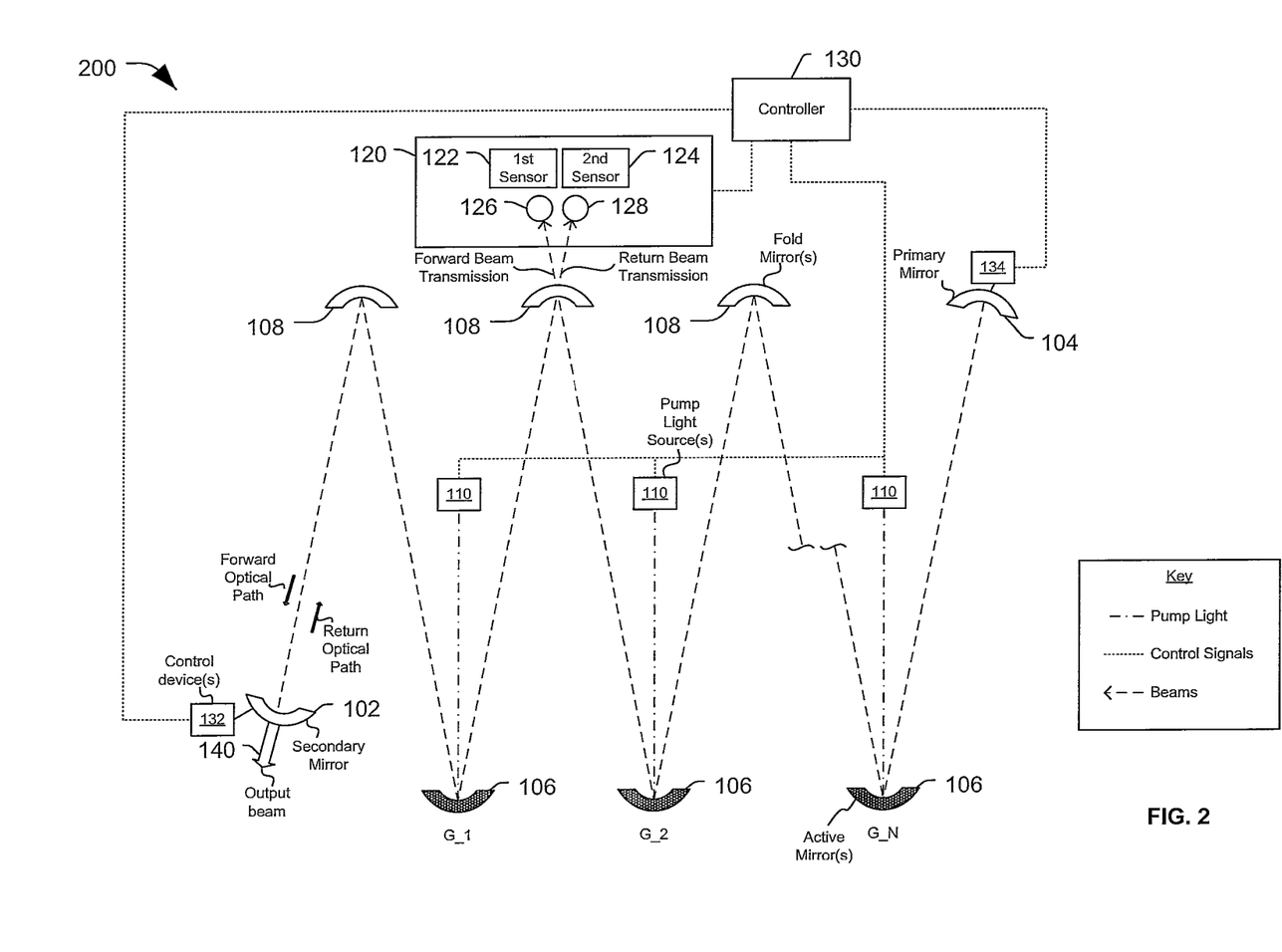
FIG. 2 is a diagram that illustrates a second embodiment of the laser resonator system of FIG. 1.

Referring to FIG. 2, a second embodiment of the laser resonator system 100 is illustrated and generally designated 200. In the laser resonator system 200, a gain (G) of each of the gain mediums of the active mirrors 106 may be set to a substantially similar value. In the laser resonator system 200, the sensor system 120 is located behind a second fold mirror of the fold mirrors 108. For example, in FIG. 2, where the laser resonator system 200 includes N active mirrors 106, gains G_1, G_2, and G_N of the active mirrors 106 may be substantially similar. The illustration of FIG. 2 is not limiting. In other embodiments, when the gain of each the gain mediums is substantially similar, the sensor system 120 may be located behind any of the fold mirror 108.

For a laser resonator system having N gain mediums, the feedback ratio may be determined based on Equation 2:

$$\text{FBR} = P\_fb/P\_inc = 1/(G\_1 * G\_2 * \ldots G\_N) \quad \text{(Eq. 2)}$$

As described above, in FIG. 2, each of the gains G_1, G_2, ... G_N are substantially similar (e.g., G_1, G_2, ... G_N=G). In this embodiment, the feedback ratio FBR of the laser resonator system 200 may be given by Equation 3:

$$\text{FBR} = 1/(G)^{2N} \quad \text{(Eq. 3)}$$

Equation 3 may be rewritten as Equation 4:

$$G^2 = 1/\text{FBR}^{1/N} \quad \text{(Eq. 4)}$$

Based on Equations 2-4, when each active mirror 106 is associated with the same gain G, and when the sensor system 120 is located behind the nth fold mirror, the feedback ratio FBR may be related to a ratio of the energy of the forward beam transmission (e.g., P1) and the energy of the return beam transmission (e.g., P2) by Equation 5:

$$P2/P1 = G^{(n-1)} P\_fb/(P\_inc/G^{(n-1)}) = G^{2(n-1)} \text{FBR} = \text{FBR}^{(1-(n-1)/N)} \quad \text{(Eq. 5)}$$

In the particular embodiment illustrated in FIG. 2, where the sensor system 120 is located (e.g., positioned) behind the second fold mirror of the fold mirrors 108, the feedback ratio may be determined based on Equation 6:

$$P2/P1 = GP\_fb/(P\_inc/G) = G^2 FBR = FBR^{(1-(1/N))} \quad \text{(Eq. 6)}$$

Thus, FIG. 2 illustrates an embodiment of the laser resonator system 200 where the sensor system 120 may be located behind any of the fold mirrors 108. Based on the location of the sensor system 120, Equation 5, and the measurements of the energy of the forward beam transmission (e.g., P1) and the energy of the return beam transmission (e.g., P2), the controller 130 may determine the feedback ratio FBR of the laser resonator system 200 and generate control signals to adjust elements of the laser resonator system 200, as described with reference to FIG. 1.

Referring to FIG. 3, a second embodiment of a laser resonator system 300 is illustrated. The laser resonator system 300 is a slab resonator in which a gain medium corresponds to a slab 306. The slab 306 may be a rectangular gain medium that is thin in one direction compared to the other two directions. In a particular embodiment, the slab 306 may be neodymium-doped yttrium aluminum garnet (Nd:YAG). In the particular embodiment of the laser resonator system 300 illustrated in FIG. 3, the slab 306 is "side pumped" (e.g., pump light is applied to the sides of the slab 306) by pump light sources 310. The slab 306 is excited by the pump light in a similar manner to the gain media of the active mirrors 106 in FIGS. 1-2, and begins projecting light (e.g., beams) that are reflected between fold mirrors 308.

The laser resonator system 300 includes a secondary mirror 302, also known as an output coupler, and a primary mirror 304. The secondary mirror 302 may be configured to receive a portion of a beam (e.g., a forward beam) output by the gain medium (e.g., the slab 306) and directed along a forward optical path. The secondary mirror 302 may output a portion of the received forward beam as an output beam 340. Another portion of the received forward beam may be reflected (e.g., projected or directed) along a return optical path toward the primary mirror 304. The primary mirror 304 may receive a beam (e.g., a return beam) directed along the return optical path and may reflect the received return beam along the forward optical path toward the secondary mirror 302. Accordingly, a forward beam travels in a direction along the forward optical path from the primary mirror 304 toward the secondary mirror 302 and a return beam travels in a direction along the return optical path from the secondary mirror 302 toward the primary mirror 304. Fold mirrors 308 along the optical paths reflect the beams along their respective optical path through the laser resonator system 300.

As in FIGS. 1-2, a portion of the beam may be transmitted (e.g., leaked) by one or more of the fold mirrors 308. Thus, as illustrated in FIG. 3, a particular fold mirror of the fold mirrors 308 may transmit a portion of the forward beam and a portion of the return beam. Forward beam transmission (e.g., leakage) may be provided to a first sensor 322, and return beam transmission (e.g., leakage) may be provided to a second sensor 324. The sensors 322 and 324 may form a sensor system 320. The sensor system 320 may be coupled to a controller 330. The sensor system 320 may provide at least one output signal corresponding to an energy of the forward beam transmission P1, an energy of the return beam transmission P2, a ratio of the energy of the forward beam transmission to the energy of the return beam transmission P2/P1 (e.g., an energy ratio), or a combination thereof, to the controller 330. In a particular embodiment, when the sensor system 320 is located behind a first fold mirror of the fold mirrors 308, the FBR of the laser resonator system 300 may be determined based on Equation 1, as described with reference to FIG. 1.

During operation, as in FIGS. 1-2, the controller 330 may receive the at least one output signal from the sensor system 320 and may control one or more control components of the laser resonator system 300 responsive to the energy ratio or other information of the at least one output signal in order to improve or maintain operation of the laser resonator system 300 or to reduce the possibility of damage to components of the laser resonator system 300. For example, the controller 330 may control a first control device 332 coupled to the secondary mirror 302, a second control device 334 coupled to the primary mirror 304, one or more of the fold mirrors 308, or a combination thereof, to change one or more optical properties of the mirrors 302, 304, and 308. For example, the controller 330 may change a shape, a pointing direction, a focal point, a location, or a combination thereof, of the mirrors 302, 304, and 308. As another example, the controller 330 may change a ROC or an axial position of one or more of the mirrors 302, 304, and 308. In addition or in the alternative, the controller 330 may control the pump light sources 310 (e.g., an amount of power output by the pump light sources 310) responsive to the energy ratio to maintain or increase the operation (e.g., the efficiency) of the laser resonator system 300 or to reduce a possibility of damage to components of the laser resonator system 300 from overheating (e.g., a temperature-induced change in shape of one of the mirrors 302, 304, and 308).

By controlling the laser resonator system 300 (e.g., via the controller 330), based on the energy of the forward beam transmission, the energy of the return beam transmission, or the energy ratio (e.g., the ratio of the energy of the forward beam transmission and the energy of the return beam transmission), the operation (e.g., the efficiency) of the laser resonator system 300 may be maintained or improved. For example, the energy ratio may be compared to an expected energy ratio associated with the laser resonator system 300, and one or more components of the laser resonator system 300 may be adjusted to decrease a deviation between the energy ratio and the expected energy ratio. Additionally or in the alternative, components of the laser resonator system 300 may be controlled responsive to the energy of the forward beam transmission, the energy of the return beam transmission, or the energy ratio to reduce a possibility of damage to the laser resonator system 300.

Figure 4:
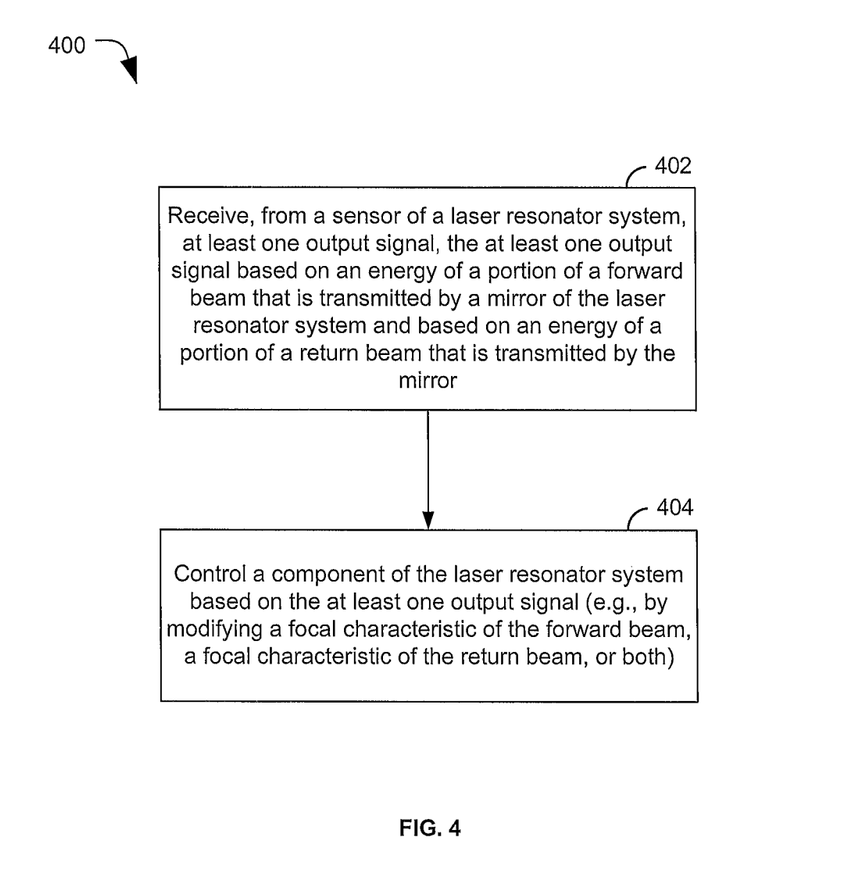
FIG. 4 is a flow chart of a particular embodiment of a method of operating a laser resonator system.

FIG. 4 illustrates a particular embodiment of a method of operation of a laser resonator system. In a particular embodiment, the method 400 may be performed by a controller, such as the controller 130 of FIGS. 1-2 or the controller 330 of FIG. 3. The method 400 includes receiving, from a sensor of a laser resonator system, at least one output signal, at 402. The at least one output signal may be based on an energy of a portion of a forward beam that is transmitted by a mirror of the laser resonator system and based on an energy of a portion of a return beam transmitted by the mirror.

For example, as illustrated in FIG. 1, the at least one output signal may be received by the controller 130 from the sensor system 120. The at least one output signal may correspond to an energy of the forward beam transmission received by the first sensor 122, to an energy of the return beam transmission received by the second sensor 124, to a ratio of the energy of the forward beam transmission to the energy of the return beam transmission (e.g., an energy ratio), or a combination thereof. The energy ratio may be compared to an expected energy ratio of the laser resonator system to determine a deviation between the energy ratio and the expected energy ratio.

The method 400 also includes, at 404, controlling a component of the laser resonator system based on the at least one output signal. For example, controlling the component of the laser resonator system may include modifying an optical characteristic (e.g., an optical property) of one or more components along a forward optical path, a return optical path, or both, such that a power of a forward beam (e.g., a beam travelling along the forward optical path) or a return beam (e.g., a beam travelling along the return optical path) is modified. In this example, as illustrated in FIG. 1, the controller 130 may control the control device 132 coupled to the secondary mirror 102, the control device 134 coupled to the primary mirror 104, one or more of the fold mirrors 108, one or more of the active mirrors 106, or a combination thereof. For example, the controller 130 may move the primary mirror 104 or the secondary mirror 102 based on the at least one output signal. As another example, the controller 130 may modify a pointing direction, a focal point, or a combination thereof, of the mirrors 102, 104, 106, and 108 based on the at least one output signal. As another example, the controller 130 may control a power (or energy) of pump light provided by the pump light sources 110 based on the at least one output signal, which may reduce a temperature of the active mirrors 106 and reduce a possibility that the active mirrors 106 will undergo a temperature-induced shape change.

Accordingly, the method 400, as performed by the controller 130 in conjunction with the sensors 122 and 124 of FIGS. 1-2 or the controller 330 in conjunction with the sensors 322 and 324 of FIG. 3, provides a method for controlling a laser resonator system to maintain or increase efficiency of the laser resonating system. For example, based on the at least one output signal, the controller may compare, in real-time, a sampled energy ratio to an expected energy ratio and may control components of the laser resonator system to reduce deviation between the sampled energy ratio and the expected energy ratio. Reducing the deviation between energy ratios may increase the performance and the efficiency of the laser resonating system. Additionally, the method 400 may enable the controller to reduce a possibility of damage to the laser resonator system. For example, the controller may reduce the power (e.g., energy) of pump light provided by the pump output sources to decrease a temperature of components of the laser resonator system. As another example, the controller may shut down the laser resonator system if the deviation between the sampled energy ratio and the expected energy ratio exceeds a threshold value.

The method 400 of FIG. 4 may be initiated or controlled by a field-programmable gate array (FPGA) device, an application-specific integrated circuit (ASIC), a processing unit, such as a central processing unit (CPU), a digital signal processor (DSP), a controller, another hardware device, a firmware device, or any combination thereof. As an example, the method 400 of FIG. 4 may be initiated or controlled by one or more processors executing code (e.g., instructions stored in a memory device).

Figure 5:
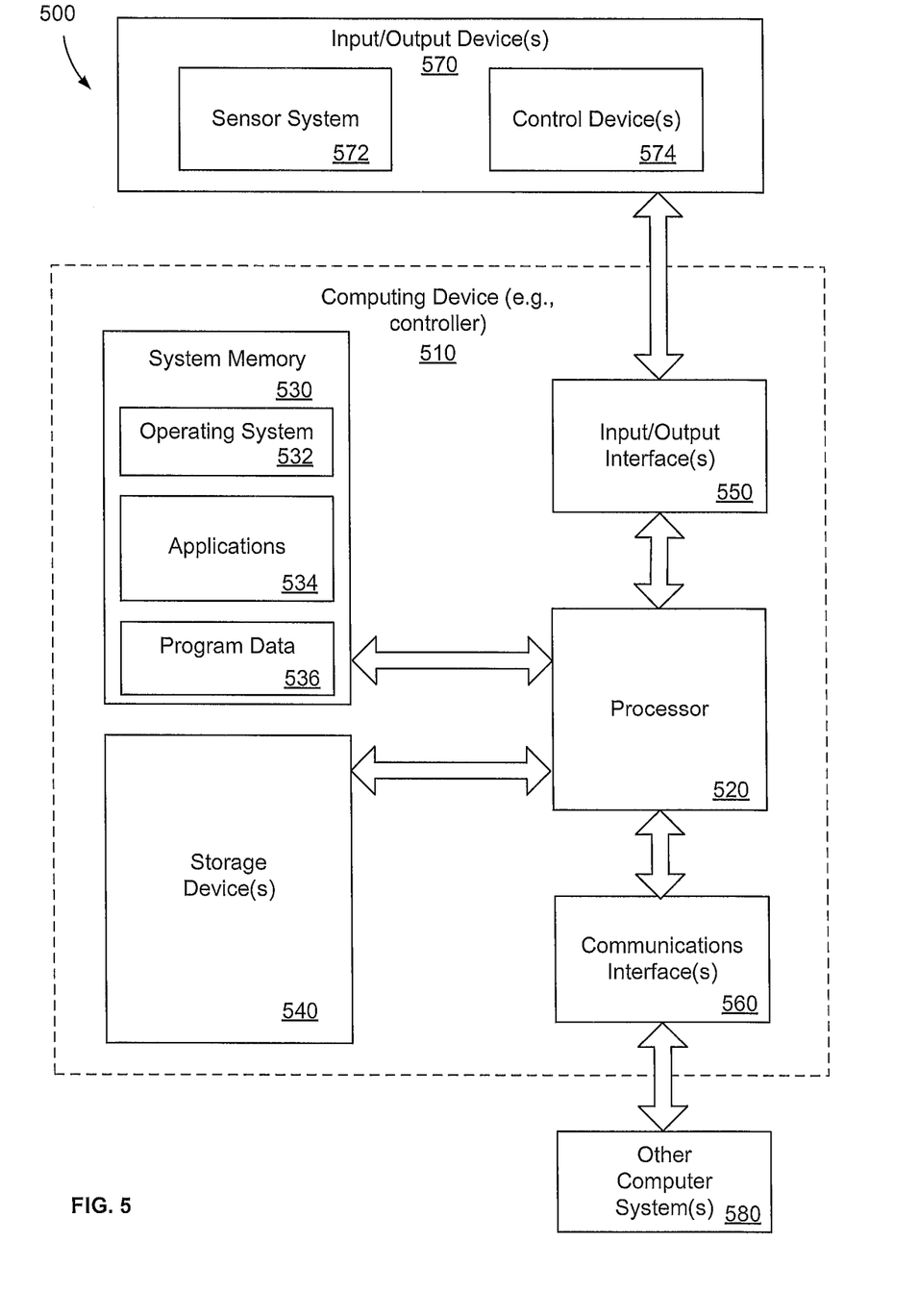
FIG. 5 is a block diagram that illustrates a particular embodiment of a computing system to operate a laser resonator system.

FIG. 5 is a block diagram of a computing environment 500 including a computing device 510 operable to control a laser resonator system. For example, the computing device 510 may be included within or correspond to the controller 130 of FIGS. 1-2 or the controller 330 of FIG. 3.

The computing device 510 may include at least one processor 520. Within the computing device 510, the at least one processor 520 may communicate with a system memory 530, one or more storage devices 540, one or more input/output interfaces 550, one or more communications interfaces 560, or a combination thereof.

The system memory 530 may include volatile memory devices (e.g., random access memory (RAM) devices), nonvolatile memory devices (e.g., read-only memory (ROM) devices, programmable read-only memory, and flash memory), or both. The system memory 530 may include an operating system 532, which may include a basic input/output system for booting the computing device 510 as well as a full operating system to enable the computing device 510 to interact with users, other programs, and other devices. The system memory 530 may also include one or more applications (e.g., instructions) 534 and program data 536. The program data 536 may include data used by the applications 534 to perform respective functions of the applications 534. The applications 534 may include instructions executable by the at least one processor 520 to operate or control a laser resonator system, such as the laser resonator system 100 of FIG. 1, the laser resonator system 200 of FIG. 2, or the laser resonator system 300 of FIG. 3.

The one or more storage devices 540 may include nonvolatile storage devices, such as magnetic disks, optical disks, or flash memory devices. The storage devices 540 may include both removable and non-removable memory devices. In a particular embodiment, the storage devices 540 may be configured to store the operating system 532, the applications 534, the program data 536, or a combination thereof. The system memory 530 and the storage devices 540 are physical devices and are not a signal.

In a particular embodiment, the at least one processor 520 is configured to execute computer executable instructions, such as the applications 534, stored at the system memory 530. The instructions may be executable to cause the at least one processor 520 to perform operations. The operations may include receiving, from a sensor system 572 of a laser resonator system, at least one output signal. The sensor system 572 may include, be included within, or correspond to the sensor system 120 of FIGS. 1-2 or the sensor system 320 of FIG. 3. The at least one output signal may be based on an energy of a portion of a forward beam transmitted by a mirror of the laser resonator system and based on an energy of a portion of a return beam transmitted by the mirror. The operations may further include controlling a component of the laser resonator system based on the at least one output signal. The component may be controlled by sending a control signal to one or more control devices 574. The one or more control devices 574 may include, be included within, or correspond to the control devices 132 or 134 of FIGS. 1-2, the control devices 332 or 334 of FIG. 3, other control devices (not shown) that control other components of the laser resonator systems 100, 200, and 300 (such as components coupled to the fold mirrors 108, 308, the active mirrors 106, or the pump light sources 110 or 310), or a combination thereof.

The one or more input/output interfaces 550 may enable the computing device 510 to communicate with one or more input/output devices 570 to facilitate user interaction. For example, the one or more input/output interfaces 550 may be adapted to receive input from a user, to receive input from another computing device, or a combination thereof. The input/output interfaces 550 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 570 may include user interface devices and displays, including some combination of buttons, keyboards, pointing devices, displays, speakers, microphones, touch screens, and other devices. Additionally, the input/output devices 570 may include components of a laser resonator system, such as the sensor system 572 and the one or more control devices 574. The processor 520 may detect interaction events based on user input received via the input/output interfaces 550. Additionally, the processor 520 may send a display to a display device via the input/output interfaces 550.

Thus, the computing device 510 may receive one or more output signals from the sensor system 572 via the input/output interfaces 550. For example, the one or more output signals may correspond to an energy of a portion of a forward beam transmitted by a mirror, an energy of a portion of a return beam transmitted by the mirror, an energy ratio, or a combination thereof. The sensor system may include or correspond to the sensor system 120 that includes the first sensor 122 and the second sensor 124 of FIGS. 1-2 or the sensor system 320 that includes the first sensor 322 and the second sensor 324 of FIG. 3. The computing device 510 may control the control devices 574 via the input/output interfaces 550. For example, the computing device 510 may send one or more control signals to the control devices 574 via the input/output interfaces 550 to control components of the laser resonator system. The control devices 574 may include or correspond to the control devices 132 and 134 of FIGS. 1-2 or the control devices 332 and 334 of FIG. 3.

The one or more communications interfaces 560 may enable the computing device 510 to communicate with one or more other computing devices or controllers 580. The one or more communications interfaces 560 may include wired Ethernet interfaces, Institute of Electrical and Electronics Engineers (IEEE) 802 wireless interfaces, electrical (or power line) interfaces, optical or radio frequency interfaces, or other wired or wireless interfaces. The other computer devices or controllers 580 may include host computers, servers, workstations, portable computers, telephones, tablet computers, or any other communication device or component.

Examples described above illustrate but do not limit the disclosure. It should also be understood that numerous modifications and variations are possible in accordance with the principles of the present disclosure. Accordingly, the scope of the disclosure is defined by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. A device comprising:
    a first sensor configured to generate a first output signal corresponding to an energy of a portion of a forward beam transmitted by a mirror of a laser resonator system;
    a second sensor configured to generate a second output signal corresponding to an energy of a portion of a return beam transmitted by the mirror, the forward beam or the return beam generated by a gain medium device of the laser resonator system; and
    a controller coupled to the first sensor and to the second sensor, wherein the controller is configured to generate, based on at least one of the first output signal or the second output signal, a control signal to control output of one or more pump light sources,
    wherein the one or more pump light sources are configured to provide pump light to the gain medium device of the laser resonator system, and
    wherein a ratio of the energy of the portion of the forward beam and the energy of the portion of the return beam corresponds to a feedback ratio of the laser resonator system.

2. The device of claim 1, further comprising:
    a first integrating sphere optically coupled to the first sensor, wherein the portion of the forward beam is provided to the first sensor via the first integrating sphere; and
    a second integrating sphere optically coupled to the second sensor, wherein the portion of the return beam is provided to the second sensor via the second integrating sphere.

3. The device of claim 1, wherein the controller is configured to control a secondary mirror of the laser resonator system based on at least one of the first output signal, the second output signal, or the ratio.

4. The device of claim 1, wherein the controller is further configured to modify, via one or more control devices of the laser resonator system, a focal characteristic of the forward beam, a focal characteristic of the return beam, or both.

5. The device of claim 1, wherein the laser resonator system comprises a plurality of fold mirrors optically coupled to one or more gain medium devices, wherein the one or more gain medium devices include the gain medium device, and wherein the mirror is one of the plurality of fold mirrors.

6. The device of claim 5, wherein at least one gain medium device of the one or more gain medium devices is an active mirror device.

7. The device of claim 5, wherein at least one gain medium device of the one or more gain medium devices is a slab.

8. A laser resonator system comprising:
    at least one gain medium device including a gain medium, wherein the gain medium is configured to output a light beam by stimulated emission responsive to pump light;

a plurality of mirrors including a primary mirror, a secondary mirror and at least one fold mirror, wherein the primary mirror, the secondary mirror and the at least one fold mirror form a forward optical path from the primary mirror to the secondary mirror and form a return optical path from the secondary mirror to the primary mirror, wherein the forward optical path and the return optical path include the at least one gain medium device; and a sensor system coupled to a particular fold mirror of the at least one fold mirror, wherein the sensor system is configured to generate output based on an energy of forward light of the forward optical path that is transmitted by the particular fold mirror and based on an energy of return light of the return optical path that is transmitted by the particular fold mirror.

9. The laser resonator system of claim 8, wherein the sensor system is configured to generate a first output signal corresponding to the energy of the forward light and to generate a second output signal corresponding to the energy of the return light.

10. The laser resonator system of claim 8, wherein the sensor system is configured to generate an output signal corresponding to a ratio of the energy of the forward light and the energy of the return light.

11. The laser resonator system of claim 8, further comprising at least one pump light source configured to provide the pump light to the at least one gain medium device.

12. The laser resonator system of claim 8, wherein the secondary mirror is configured to receive a forward beam via the forward optical path, to allow a first portion of the forward beam to pass as an output beam, and to reflect a second portion of the forward beam along the return optical path as a return beam.

13. The laser resonator system of claim 8, further comprising a controller coupled to the sensor system, wherein the controller is configured to adjust, via one or more control devices, focus of the forward light, to adjust focus of the return light, or both, based on the output of the sensor system.

14. A method comprising:

receiving, at a controller of a laser resonator system from a sensor of the laser resonator system, at least one output signal, the at least one output signal based on an energy of a portion of a forward beam that is transmitted by a mirror of the laser resonator system and based on an energy of a portion of a return beam that is transmitted by the mirror; and controlling a component of the laser resonator system, based on the at least one output signal, to control output of one or more pump light sources, wherein the one or more pump light sources are configured to provide pump light to a gain medium device of the laser resonator system.

15. The method of claim 14, wherein the component of the laser resonator system is controlled to move a primary mirror of the laser resonator system based on the at least one output signal.

16. The method of claim 14, wherein the component of the laser resonator system is controlled to move a secondary mirror of the laser resonator system based on the at least one output signal.

17. The method of claim 14, wherein the component of the laser resonator system is controlled to change, based on the at least one output signal, an optical property of a primary mirror of the laser resonator system or an optical property of a secondary mirror of the laser resonator system.

18. The method of claim 14, wherein the at least one output signal indicates a ratio of the energy of the portion of the forward beam and the energy of the portion of the return beam, and wherein the output of the one or more pump light sources is adjusted based on the ratio.

19. A device comprising:

a first sensor configured to generate a first output signal corresponding to an energy of a portion of a forward beam of a laser resonator system;

a second sensor configured to generate a second output signal corresponding to an energy of a portion of a return beam of the laser resonator system, at least one of the forward beam or the return beam generated by a gain medium device of the laser resonator system;

a first integrating sphere optically coupled to the first sensor, wherein the portion of the forward beam is provided to the first sensor via the first integrating sphere; and a second integrating sphere optically coupled to the second sensor, wherein the portion of the return beam is provided to the second sensor via the second integrating sphere, wherein a ratio of the energy of the portion of the forward beam and the energy of the portion of the return beam corresponds to a feedback ratio of the laser resonator system.

* * * * *